United States Patent [19]
Ehl et al.

[11] 4,323,396
[45] Apr. 6, 1982

[54] PROCESS FOR THE PREPARATION OF PIGMENT FORMULATIONS AND THEIR USE

[75] Inventors: Klaus Ehl, Frankfurt am Main; Reinhold Deubel, Bad Soden am Taunus, both of Fed. Rep. of Germany

[73] Assignee: Hoechst Aktiengesellschaft, Frankfurt am Main, Fed. Rep. of Germany

[21] Appl. No.: 231,779

[22] Filed: Feb. 5, 1981

[30] Foreign Application Priority Data

Feb. 7, 1980 [DE] Fed. Rep. of Germany ....... 3004442

[51] Int. Cl.$^3$ ............................................. C09D 11/02
[52] U.S. Cl. ....................................... 106/23; 106/20; 106/22; 106/288 Q
[58] Field of Search ................... 106/22, 23, 20, 288 Q

[56] References Cited

U.S. PATENT DOCUMENTS 4,186,025 1/1980 Kang et al. ...................... 106/288Q
4,280,960 7/1981 Nonn et al. ...................... 106/288 Q Primary Examiner—John Kight, III
Assistant Examiner—Amelia B. Yarbrough
Attorney, Agent, or Firm—Curtis, Morris & Safford

[57] ABSTRACT

Solid preparations of organic pigments are obtained from aqueous systems which contain the pigment or in which it has been formed by adding to this system a polysaccharide having anionic groups and an affinity for this pigment, removing the treated pigment from this aqueous system and drying it. These preparations are useful for pigmenting hydrophilic media, especially aqueous or water-dilutable paints and coating agents, printing inks and printing pastes. The preparations can be prepared and processed without any great mechanical expenditure.

12 Claims, No Drawings

PROCESS FOR THE PREPARATION OF PIGMENT FORMULATIONS AND THEIR USE

The subject of the invention is a process for the preparation of solid formulations of organic pigments, which comprises adding a polysaccharide which contains anionic groups and has an affinity for the pigment, to an aqueous medium in which the pigment is present or in which the pigment is formed, separating off the treated pigment mechanically and drying this product.

A further subject of the invention is the use of the solid pigment formulations obtained in accordance with the invention for pigmenting hydrophilic systems.

Organic pigments are in most cases obtained from their process of preparation in the form of hydrophobic crystals which additionally tend to form aggregates and agglomerates. Pigments of this type are therefore generally difficult to disperse in water or binders containing water, and accordingly also exhibit a poor tinctorial strength. For these reasons expensive dispersion devices, such as, for example, kneaders and bead mills, are usually employed when producing aqueous preparations of organic pigments, in order to achieve full tinctorial strength. Liquid pigment concentrates which have been prepared using such dispersion devices and which contain added solvents and surface-active substances in addition to water and pigment, and can be diluted by stirring into water or aqueous systems, are available commercially. Solid pigment formulations which have improved dispersibility in water and which have been obtained by intimately grinding dry pigment and auxiliaries are also known.

The subject of the invention is, accordingly, a simple process which produces, without expensive apparatus, solid pigment formulations which can also be incorporated without great effort into hydrophilic systems. Compared with liquid formulations, solid formulations having a low content of auxiliary possess the advantage that they require less expenditure on storage and transport because of their lower volume and weight. In addition, liquid formulations tend to undergo changes during storage, for example recrystallization and flocculation and, as a result, losses in tinctorial strength and alterations of color shade. Besides this, combustible solvents in liquid formulations require special precautions.

It is also known to treat organic pigments in aqueous systems with auxiliaries, for example in the course of their synthesis. However, when the pigments are mechanically separated from the aqueous system, for example by filtration, and are washed, the auxiliaries added are to a very large extent removed unless special measures are taken. The process according to the invention, however, makes it possible, without such special measures, to treat organic pigments with small quantities of auxiliaries in such a way that the powder pigments which have been prepared by customary mechanical separation, for example filtration, drying and subsequent grinding, are readily dispersible in hydrophilic systems.

Preferred embodiments of the invention will be illustrated in greater detail in the text which follows.

The polysaccharide which contains anionic groups and which has an affinity for the pigment to be treated, referred to for brevity, in the text which follows, as "treatment agent", is either soluble in water or can swell in water. The required affinity to the pigment surface, which produces a "substantive adsorption" and retention on the pigment surface, can be determined in a simple preliminary test: if the treatment agent remains largely on the pigment surface during the mechanical separation and when the press cake is washed, a pigment which can readily be redispersed in water will be obtained after the customary drying and grinding.

Suitable treatment agents are anionically modified carbohydrates such as starches, xanthates, alginates, pectins or agar, and suitable anionic groups are, in particular, carboxyl groups and partial esters of phosphoric acid and sulfuric acid. The anionic groups can also be present in the form of a salt. Phosphoric acid partial esters of starch are particularly preferred.

The treatment agents can be used on their own or as mixtures. They are appropriately employed in quantities of 0.5 to 10%, relative to the weight of pigment, advantageously in quantities between 0.5 and 5%. Higher concentrations produce no further advantages, but can impair the filterability.

Organic pigments of all classes can be treated in accordance with the invention, for example copper phthalocyanines, quinacridones, dioxazines, anthanthrones, thioindigo pigments, naphthalenetetracarboxylic acid derivatives and perylenetetracarboxylic acid derivatives, but particularly azo pigments of the monoazo and disazo series, above all those containing, as coupling components, acetoacetic acid arylamides, $\beta$-hydroxynaphthoic acid arylamides or $\beta$-hydroxynaphthoic acids which have been converted into lakes, and also pigments belonging to the series comprising the triphenylmethane dyestuffs, such as Alkali Blue.

The treatment agent can be added in a solid or dissolved form to an aqueous suspension of the pigments or of the corresponding precursors. Thus the crude suspension, containing electrolyte, produced in the preparation of the pigment, for example, in the case of azo pigments, the coupling liquor, can be used as a suspension of the pigment. It is also possible, however, to treat suspensions of pigment press cakes which have been washed if necessary. In every case the aqueous pigment suspension is stirred for a short time with the treatment agents, and conventional stirring units such as anchor stirrers or frame paddle stirrers can be used. The treated pigment is then mechanically separated, for example filtered off. If necessary, in some cases for the removal of salts, the pigment suspension is washed and the treated pigment which has been separated off is dried and ground. "Treated pigment which has been separated off" is to be understood in this connection as meaning that the product is separated from the aqueous phase in a customary manner, the aqueous phase being removed by customary methods, such as suction draining, pressing out or centrifuging, to such an extent as appears appropriate.

The products can also be converted to a granular form, their easy redispersibility in water being retained. Mixtures of pigments can also be treated in accordance with the invention.

According to the invention, the pigment formulations are used for pigmenting hydrophilic systems, that is to say they are used in aqueous systems or systems which contain water or can be diluted with water. Customary stirring or mixing devices are suitable in this connection, for example conventional stirrer units or high-speed stirrers, and solvents and customary auxiliaries, fillers and additives can also be added, if appropriate.

Brief dispersion times are sufficient to achieve the full tinctorial strength in the medium of use.

The pigments which have been treated in accordance with the invention are advantageously suitable for pigmenting aqueous or water-dilutable lacquers, paints and coating agents, for example emulsion paints, and for pigmenting aqueous printing inks, for example flexographic printing inks, wallpaper inks and printing pastes for pigment printing on textiles.

The pigments which have been treated in accordance with the invention can be employed on their own or, advantageously, as mixtures, and are suitable for use in combination with conventional powder pigments or pigment formulations by virtue of their low content of treatment agents. The low content of auxiliaries also has an advantageous effect on the volume to be stored and the weight to be transported and prevents problems caused by incompatibility with other auxiliaries, for example in printing pastes.

Valuable, solid pigment formulations which have diverse uses, and can be dispersed in the medium of use, using the simplest means, with development of full tinctorial strength, are therefore obtained in accordance with the invention in an extremely simple manner - without an additional process stage, if the additive is introduced during coupling.

The invention is illustrated in greater detail in the examples which follow. In these examples, parts and percentage figures relate to weight.

The following treatment agents were employed:

I. An anionic phosphate ester made from potato starch, water-soluble, approx. 1% P content ((R)RETAMYL AP from Scholtens Chemische Fabrieken, Foxhohl).

II. A commercial alginate of low viscosity ((R)MANUTEX F from Alginate Industries Ltd., London).

III. A commercial alginate of high viscosity (MANUTEX RS 92).

IV. A commercially available agar product, technical grade (Oxoid-Agar No. 3 from Messrs. Oxoid, Wesel).

V. Xanthate ((R)KELZAN from Kelco, Brussels).

EXAMPLE 1

Pigment Yellow 3 is prepared in a known manner by coupling diazotised 4-chloro-2-nitroaniline with N-aceto-acetyl-o-chloroanilide. 3%, relative to the pigment, of treatment agent I are stirred into the coupling liquor. The pigment is then filtered off in a customary manner, washed with water, dried and ground. The pulverulent pigment formulation thus obtained exhibits considerably better dispersibility in water and aqueous systems than an untreated Pigment Yellow 3. As a modification of the process, it is also possible to isolate and wash the pigment in the form of a press cake, after the coupling reaction, and then to treat the salt-free, aqueous press cake with 3% of treatment agent I. Drying and grinding are then carried out as above.

EXAMPLE 2

Pigment Yellow 3 is treated analogously to Example 1, but 3% of treatment agent II are employed as the treatment agent. The pigment preparation thus obtained also has a distinctly better dispersibility in water than untreated Pigment Yellow 3.

EXAMPLE 3

Treating Pigment Yellow 3 analogously to Example 1 and 2 with 1% of treatment agent III leads to a product having a dispersibility in water which is as good as that in Example 1 and 2.

EXAMPLE 4

Treating Pigment Yellow 3 analogously to Example 1 with 3% of treatment agent IV also produces a powder which is readily dispersible in water.

EXAMPLE 5

Pigment Yellow 3 is treated analogously to Example 1 with 3% of treatment agent V. The formulation obtained is more readily dispersible in water than untreated Pigment Yellow 3.

EXAMPLE 6

Pigment Yellow 98 is prepared in a known manner by coupling diazotized 4-chloro-2-nitroaniline with N-aceto-acetyl-3-chloro-6-aminotoluene. The coupling liquor or the press cake after washing is treated with 3% of treatment agent I and the product is worked up analogously to Example 1.

The pigment powder thus obtained is more readily dispersible than untreated Pigment Yellow 98.

EXAMPLE 7

Pigment Yellow 1 is prepared in a known manner by coupling diazotized 3-nitro-4-aminotoluene with N-aceto-acetylaniline. Treating the coupling liquor or the press cake with 3% of treatment agent I, analogously to Example 1, leads to a pigment powder which is readily dispersible in water.

EXAMPLE 8

Pigment Red 194 is prepared as specified in German Auslegeschrift No. 1,569,736 and 3% of treatment agent I are added at the stage of the aqueous press cake. The powder pigment which is obtained after working up in a customary manner by drying and grinding is considerably more readily dispersible in water than untreated Pigment Red 194.

Treatment with treatment agents II, III, IV and V leads to products of similarly good dispersibility.

EXAMPLE 9

Pigment Orange 43 is prepared as specified in German Auslegeschrift No. 1,569,736 and is treated, in the form of an aqueous press cake, with 3% of treatment agent I. Its dispersibility in water, compared with the untreated pigment, is thereby distinctly improved. Treatment agents II to V can also be used to improve its dispersibility in water.

EXAMPLE 10

Pigment Violet 19 is prepared as specified in German Pat. No. 1,184,881 and is treated, in the form of the aqueous press cake, with 3% of treatment agent I, as a result of which its dispersibility in water is distinctly improved. Treatment agents II to V also increase its dispersibility in water or aqueous systems.

EXAMPLE 11

Pigment Blue 18 (Alkali Blue) is prepared by an acid condensation reaction between 4-chlorobenzotrichloride and chlorobenzene, followed by reaction with a mixture of aniline and m-toluidine and sulfonation of the reaction product. Reprecipitation gives a press cake containing a little mineral acid, to which 3% of treatment agent I are added, giving, after drying and grinding, a powder with excellent dispersibility in water. Untreated Alkali Blue is considerably more difficult to disperse in aqueous systems. A similarly good dispersibility in water is achieved using treatment agents II to V.

EXAMPLE 12

3% of treatment agent I are added to Pigment Blue 15 (copper phthalocyanine), β-modification, in the form of an aqueous press cake. Drying and grinding gives a powder which is more readily dispersible in water than untreated Pigment Blue 15. Treatment agents II to V give products with a similarly good dispersibility.

EXAMPLE 13

Pigment Orange 34 is prepared by coupling diazotized dichlorobenzidine with p-tolylmethylpyrazolone. A pigment powder which is readily dispersible in water can be obtained analogously to Example 1 by mixing the coupling liquor with 3% of treatment agent I. Treatment with 3% of treatment agent IV, 3% of treatment agent II, 1% of treatment agent III or 3% of treatment agent V also give pigment preparations which have a considerably improved dispersibility in water, compared with the untreated pigment.

We claim:

1. A process for the manufacture of pigment preparations which comprises contacting an organic pigment with a polysaccharide having anionic groups and an affinity to said pigment in an aqueous medium, separating mechanically the contacted pigment and drying it.

2. A process as claimed in claim 1, wherein the aqueous medium is the reaction medium in which the pigment is formed.

3. A process as claimed in claim 1, wherein a press-cake of the pigment is suspended in the aqueous medium.

4. A process as claimed in claim 1, wherein the pigment is a phthalocyanine, quinacridone, dioxazine, anthanthrone, thioindigo, naphthalenetetracarboxylic acid, perylenetetracarboxylic acid, triphenylmethane or azo pigment.

5. A process as claimed in claim 2, wherein the pigment is an azo pigment.

6. A process as claimed in claim 1, wherein 0.5 to 10%, referred to the weight of the pigment, of the polysaccharide are added to the aqueous medium.

7. A process as claimed in claim 1, wherein 0.5 to 5%, referred to the weight of the pigment, of the polysaccharide are added to the aqueous medium.

8. A process as claimed in claim 1, wherein the polysaccharide is a partial phosphoric acid ester of starch.

9. A coated organic pigment obtained by the process as claimed in claim 1.

10. A process for pigmenting a hydrophilic medium which comprises incorporating into that medium a pigment as claimed in claim 9.

11. A process as claimed in claim 10, wherein the medium is an aqueous or water-dilutable varnish.

12. A process as claimed in claim 10, wherein the medium is an aqueous printing ink or printing paste.

* * * * *